United States Patent
Meverden et al.

(10) Patent No.: US 7,465,776 B2
(45) Date of Patent: Dec. 16, 2008

(54) HIGH CRYSTALLINITY, HIGH MELT FLOW RATE POLYPROPYLENE

(75) Inventors: Craig Meverden, Wexford, PA (US); Andrew Schnitgen, Mars, PA (US); Sehyun Kim, Murrysville, PA (US)

(73) Assignee: Sunoco, Inc. (R&M), Philadelphia, PA (US)

( * ) Notice: Subject to any disclaimer, the term of this patent is extended or adjusted under 35 U.S.C. 154(b) by 0 days.

(21) Appl. No.: 11/809,114

(22) Filed: May 30, 2007

(65) Prior Publication Data

US 2007/0287813 A1 Dec. 13, 2007

Related U.S. Application Data

(60) Provisional application No. 60/810,051, filed on Jun. 1, 2006.

(51) Int. Cl.
*C08F 110/06* (2006.01)
(52) U.S. Cl. .................... 526/351; 526/142; 526/125.3; 526/124.3; 526/158
(58) Field of Classification Search ................. 526/142, 526/125.3, 124.3, 158, 351
See application file for complete search history.

(56) References Cited

U.S. PATENT DOCUMENTS

| | | | |
|---|---|---|---|
| 4,522,994 A | 6/1985 | Chiba et al. | |
| 5,141,994 A | 8/1992 | Kakugo et al. | |
| 5,308,908 A | 5/1994 | Fukui et al. | |
| 5,414,027 A | 5/1995 | DeNicola, Jr. et al. | |
| 6,323,150 B1 | 11/2001 | Kojoh et al. | |
| 6,635,734 B2 | 10/2003 | Shamshoum et al. | |
| 6,657,025 B2 * | 12/2003 | Blackmon et al. | 526/142 |
| 7,022,796 B2 | 4/2006 | Blackmon et al. | |

FOREIGN PATENT DOCUMENTS

| | | |
|---|---|---|
| JP | 01-104639 A | 4/1989 |
| JP | 04-202507 A | 7/1992 |
| WO | WO93/09150 A | 5/1993 |

* cited by examiner

*Primary Examiner*—Ling-Siu Choi
(74) *Attorney, Agent, or Firm*—Drinker Biddle & Reath LLP

(57) ABSTRACT

High melt flow rate high crystallinity polypropylene homopolymer are produced in a bulk polymerization process using a Ziegler-Natta catalyst containing a combination of two internal electron donors and selected external donors. The high melt flow rate, high crystallinity polypropylene homopolymers produced according to the current invention display improved flexural modulus and tensile yield stress when nucleated.

6 Claims, No Drawings

HIGH CRYSTALLINITY, HIGH MELT FLOW RATE POLYPROPYLENE

RELATED APPLICATIONS

This application claims priority under 35 U.S.C. § 119(e) to Provisional Patent Application No. 60/810,051, filed on Jun. 1, 2006.

FIELD OF THE INVENTION

The present invention relates to polypropylene homopolymers and compositions containing polypropylene homopolymers. More specifically, the present invention relates to polypropylene homopolymers that are both highly crystalline and have a high melt flow rate.

BACKGROUND OF THE INVENTION

In general, a specific catalyst system is required to produce highly crystalline polypropylene. The catalyst system to produce such polypropylene requires a stereo-regulating agent or external donor. Well known external donors that are used to produce highly stereo regular materials are dicyclopentyldimethoxy silane and diphenyldimethoxy silane. However, these donors significantly reduce the efficiency of hydrogen, which is used as a chain transfer agent in the polymerization. As a result, in a commercial manufacturing facility, the use of these donors limits the polymers produced to low melt flow rates.

U.S. Pat. No. 4,522,994 to Chiba et al describes highly crystalline, high melt flow rate polypropylene produced using a Ziegler-Natta (ZN) catalyst in a slurry process. Although U.S. Pat. No. 4,522,994 claims to have achieved a combination of high crystallinity and high melt flow rate, it does not address the content of xylene solubles in the material as a measure of crystallinity. Further, the slurry process used in U.S. Pat. No. 4,522,994 results in extraction of a significant amount of the solubles produced in the polymerization. Hence, the high total crystallinity of the material is achieved by removing non-crystalline material produced in the process, rather than by controlling its formation in the first instance. This not only reduces the yield from the polymerization, but also creates an additional waste handling issue.

U.S. Pat. No. 6,323,150 to Kojoh et al describes ZN catalysts containing a combination of two internal donors. The first internal donor is either a polycarboxylic acid compound or a polyether. The second internal donor compound is also either a polycarboxylic acid compound or a polyether. The catalysts described in U.S. Pat. No. 6,323,150 are disclosed as being capable of producing olefin polymers of high stereo regularity. However, all of the examples provided in U.S. Pat. No. 6,323,150 describe polymers produced using a slurry process.

Liquid phase polymerization processes can be grouped into two general types; bulk processes and slurry processes. Both the bulk process and the slurry process are described by Ser van der Ven in "Polypropylene and Other Polyolefins", © 1990, Elsevier Science Publishing Company, Inc., pp. 119-125. Both the slurry process and the bulk process are described as operating with a suspension of growing polymer particles in a liquid. In the case of the slurry process, the liquid is an inert solvent, such as hexane. In the case of the bulk process it is liquid monomer. U.S. Pat. No. 4,522,994 and U.S. Pat. No. 6,323,150 both describe polymers produced in a so-called slurry process.

Another means of achieving a high melt flow rate in a polymer is through post polymerization treatment with a vis-breaking agent to reduce the average molecular weight of the polymer and thus increase the melt flow rate. However, this method necessitates an additional process step and negatively affects the molecular weight distribution Mw/Mn of the polymer. It also creates additional xylene soluble material, which negatively affects the properties of the material.

It would therefore be desirable to provide a process for producing a highly crystalline, high melt flow rate polypropylene using a bulk liquid process. In such a process, the crystallinity, xylene solubles and melt flow rate of the polymer would be controlled by the selection of catalyst and polymerization conditions. Thus the need to extract or wash out solubles, or perform vis-breaking operations would be eliminated.

SUMMARY OF THE INVENTION

The present invention provides a propylene homopolymer produced in a bulk polymerization process in the presence of a Ziegler-Natta catalyst containing a combination of two internal donors comprising a phthalate and one of a diether or a succinate, and an external donor selected from the group consisting of cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes. The propylene homopolymer has a xylene soluble content of less than 2 percent, and a xylene insoluble fraction having a meso pentad content of greater than 96 percent and an average meso run length of at least 140. The propylene homopolymer also has a melt flow rate of at least 60 dg/min.

The present invention also includes a process for making the polypropylene homopolymer according to the present invention.

DESCRIPTION OF THE INVENTION

The present invention provides a process for producing highly crystalline, low xylene solubles polypropylene homopolymers that also display high melt flow rate, in a bulk liquid process. The present invention further provides the highly crystalline, low xylene solubles, high melt flow rate polypropylene homopolymers produced using the process according to the present invention. When formulated with a nucleator, the polypropylene homopolymers according to the current invention exhibit a flexural modulus of at least 300 kpsi, a tensile yield stress of at least 5000 psi, and provide a good base material for compounding with rubber, fillers and other additives.

The polymers according to the present invention have melt flow rates of at least 60 dg/min, as measured using test method ASTM-D1238. The melt flow rates of the polypropylene homopolymers according to the current invention preferably range from 60 to 400 dg/min, for example 60, 90, 300 and 400 dg/min. The crystallinity of the polypropylene homopolymers according to the current invention is measured using several properties of the polymers. The content of xylene solubles in the polymers is less than 2 percent as measured using test method ASTM-D5492. The meso pentad (mmmm) content in the xylene insoluble portion of the polymers according to the current invention is at least 96 percent as measured by $^{13}C$ NMR. Also, the average meso run length (Nm) in the xylene insoluble portion is at least 140. The meso run length is also determined by 13C NMR spectra and can be expressed as either Nm=(2 mm+mr)/mr or Nm=2(mm/mr)+1. The overall crystallinity of the polymers according to the current invention may be measured using either differential scanning calorimetry (DSC) or x-ray diffraction (XRD).

The polypropylene homopolymers having a high melt flow rate according to the current invention are produced in-reactor, without the necessity of vis-breaking. The polypropylene homopolymers are produced in a liquid phase bulk process using a particular Zeigler-Natta (ZN) catalyst system containing a combination of two internal electron donors, and an external electron donor.

In terms of the catalysts, according to the current process the ZN catalyst contains a combination of two internal electron donors, where the first internal donor is a phthalate and the second internal donor is selected from a succinate and a diether. The ratio of the first internal donor to the second internal donor is from about 5:95 to 95:5 by weight. These specific ZN catalysts allow one to obtain both high crystallinity and high melt flow rate in a polypropylene homopolymer using common external donors, such as cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes $(R_2N)_2Si(OCH_2CH_3)_2$ and $(piperidinyl)_2Si(OCH_3)_2$. In general, these external donors all provide high efficiency of hydrogen as a chain transfer agent in a bulk liquid phase polymerization. It has been found that the combination of a ZN catalyst containing a combination of two internal donors as described above with the selected external donors allows the production of highly crystalline, high melt flow rate, polypropylene homopolymers in a bulk liquid polymerization with low production of xylene solubles.

The present process is superior to prior art slurry processes, which rely on extraction of xylene solubles by an inert solvent, such as hexane, to achieve the combination of high crystallinity and high melt flow rate, with low solubles in the resulting polymer.

Two batches of polypropylene homopolymer according to the present invention were prepared in a bulk liquid process. A Zeigler-Natta catalyst containing a combination of phthalate and diether as internal donors was used in combination with cyclohexylmethyldimethoxysilane as an external donor. Two comparative batches were also produced in a bulk liquid process. In the comparative examples a ZN catalyst containing a single phthalate internal donor, was used in combination with cyclohexylmethyldimethoxysilane as an external donor. Two further comparative batches were prepared in a bulk liquid process using the Ziegler-Natta catalyst containing a combination of phthalate and diether as internal donors along with dicyclopentyldimethoxysilane as external donor. The conditions for each polymerization and the properties of the resulting polymers is shown in Table 1.

Comparative batches 3 and 4 demonstrate that although a high MFR polymer can be prepared with a ZN catalyst containing a phthalate internal donor and cyclohexylmethyldimethoxysilane external donor, the crystallinity of the polymers is lower than for the invention examples, even at higher levels of external donor. Comparative batches 5 and 6 show that using dicyclopentyldimethoxysilane as external donor with the ZN catalyst containing a combination of phthalate and diether internal donors produces highly crystalline polymers but at significantly lower MFR than the invention examples.

TABLE 1

|  | Batch 1 Invention | Batch 2 Invention | Batch 3 Comp. | Batch 4 Comp. | Batch 5 Comp. | Batch 6 Comp. |
| --- | --- | --- | --- | --- | --- | --- |
| Internal Donor(s) | phthalate/ diether | phthalate/ diether | phthalate | phthalate | phthalate/ diether | phthalate/ diether |
| External Donor | CMDS | CMDS | CMDS | CMDS | DCPMS | DCPMS |
| Temp. (° C.) | 70 | 75 | 70 | 75 | 70 | 75 |
| Si/Ti (mol/mol) | 20 | 20 | 40 | 40 | 20 | 20 |
| $H_2$/propylene (mol/mol) | 0.022 | 0.022 | 0.022 | 0.022 | 0.022 | 0.022 |
| Yield (gPP/gCat) | 65171 | 65409 | 41817 | 45639 | 64874 | 73877 |
| Polymer Properties |  |  |  |  |  |  |
| MFR (dg/min.) | 93 | 101 | 97 | 119 | 46 | 34 |
| % XS | 1.63 | 1.45 | 2.32 | 1.93 | 1.26 | 1.10 |
| mmmm (XI fraction) | 0.9663 | 0.9696 | 0.9628 | 0.9653 | 0.9703 | 0.9683 |
| Nm (XI fraction) | 145 | 161 | 122 | 127 | 140 | 154 |
| $T_m$ (DSC) | 161.5 | 161.3 | 160.9 | 160.7 | 163.2 | 163.4 |
| $T_c$ (DSC) | 116.2 | 116.0 | 115.3 | 115.3 | 116.0 | 115.5 |
| % xtall (DSC) | 64.2 | 62.9 | 62.7 | 62.9 | 65.0 | 64.4 |
| % xtall (XRD) | 61.9 | 62.0 | 60.1 | 61.0 | 65.0 | 63.5 |

CMDS = cyclohexylmethyldimethoxysilane
DCPMS = dicyclopentyldimethoxysilane
XI = xylene insoluble In the Examples, Si/Ti is the molar ratio of external donor (Si) to titanium (Ti) in the catalyst, $H_2$/propylene is the molar ratio of $H_2$ to propylene charged to the reactor and % xtall is the wt % of crystalline polymer as measured by either DSC or XRD.

The properties of the polypropylene homopolymers according to the current invention are also superior to similar polypropylenes produced using a slurry process with high stereoregularity external donors, or a bulk liquid process using ZN catalysts containing a single internal donor. A comparison of a polymer according to the current invention and polymers produced according to alternative methods is shown in Table 2.

TABLE 2

| | Polymerization Process | | |
|---|---|---|---|
| Catalyst | Hexane Slurry | Bulk | Bulk |
| Internal/External Donor Combination | Phthalate/Diphenyl dimethoxysilane | Phthalate/Cyclohexylmethyl dimethoxysilane | Phthalate-diether/Cyclohexylmethyl dimethoxysilane |
| MFR | 112 | 119 | 106 |
| % XS | 1.35* | 1.93 | 1.59 |
| % mmmm | 97.1 | 96.5 | 97.4 |
| Nm | 130-170 | 127 | 176 |
| Flexural Modulus 1% secant (kPsi) | 289 | <280 | 307 |
| Tensile Stress Yield (Psi) | 5300 | <5000 | 5700 |

Flexural Modulus measured according to ASTM D790
Tensile Stress Yield measured according to ASTM D638

Referring to Table 2, all three samples display comparable melt flow rate. The crystallinity of the materials, as measured by % mmmm and Nm shows that the material produced according to the current invention is more crystalline. The material produced in the hexane slurry process has a lower xylene solubles content than both materials produced in the bulk process. However, this is believed to be the result of a portion of the xylene solubles being extracted by the hexane slurry.

Nucleated samples of the three polymers in Table 2 were tested for Flexural Modulus and Tensile Stress Yield according the indicated methods. The data indicate that the material produced according to the current invention displays superior flexural modulus and tensile stress yield compared to the other two materials.

What is claimed is:

1. A composition comprising:
    a propylene homopolymer produced in a bulk polymerization process in the presence of a Ziegler-Natta catalyst containing a combination of two internal donors comprising a phthalate and one of a diether or a succinate, and an external donor selected from the group consisting of cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes,
    the propylene homopolymer having a xylene soluble content of less than 2 percent, and a xylene insoluble fraction having a meso pentad content of greater than 96 percent and an average meso run length of at least 140,
    the propylene homopolymer having a melt flow rate of at least 60 dg/min to 300 dg/min.

2. The composition according to claim 1, wherein the propylene homopolymer when nucleated has a flexural modulus of greater than 300 kPsi and tensile yield stress of greater than 5000 psi.

3. The composition according to claim 1, wherein a ratio of the two internal donors to each other is from 95:5 to 5:95 by weight.

4. A process for producing a high crystallinity, high melt flow rate propylene homopolymer comprising:
    polymerizing propylene in a bulk process in the presence of a Ziegler-Natta catalyst containing a combination of two internal donors comprising a phthalate and one of a diether or a succinate, and an external donor selected from the group consisting of cyclohexylmethyldimethoxysilane, cyclohexylethyldimethoxysilane, diphenyldimethoxysilane, phenyltriethoxysilane, 3,3,3-trifluoropropylmethyldimethoxysilane, diisopropyldimethoxysilane, octylmethyldimethoxysilane, isobutyltrimethoxysilane, isobutyltriethoxysilane, n-propyltrimethoxysilane, di-t-butyldimethoxysilane, cyclopentyl 1,1-dimethyl-2,2-dimethylethyldimethoxysilane and diamino silanes,
    to produce a propylene homopolymer having a xylene soluble content of less than 2 percent, and a xylene insoluble fraction having a meso pentad content of greater than 96 percent and an average meso run length of at least 140,
    the propylene homopolymer having a melt flow rate of at least 60 dg/min to 300 dg/min.

5. The process according to claim 4, wherein the external donor is cyclohexylmethyldimethoxysilane.

6. The process according to claim 4, wherein a ratio of the two internal donors to each other is from 95:5 to 5:95 by weight.

* * * * *